United States Patent
Kuo et al.

(10) Patent No.: US 7,246,597 B2
(45) Date of Patent: Jul. 24, 2007

(54) METHOD AND APPARATUS TO OPERATE A HOMOGENEOUS CHARGE COMPRESSION-IGNITION ENGINE

(75) Inventors: Tang-Wei Kuo, Troy, MI (US); Paul M. Najt, Bloomfield Hills, MI (US); James A. Eng, Troy, MI (US); Rodney B. Rask, Grosse Pointe Woods, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/398,776

(22) Filed: Apr. 6, 2006

(65) Prior Publication Data

US 2007/0107692 A1    May 17, 2007

Related U.S. Application Data

(60) Provisional application No. 60/737,156, filed on Nov. 16, 2005.

(51) Int. Cl.
    *F02B 9/04*    (2006.01)
(52) U.S. Cl. .................. 123/305; 123/434; 123/406.26
(58) Field of Classification Search ................ 123/305, 123/434, 406.26
    See application file for complete search history.

(56) References Cited

U.S. PATENT DOCUMENTS

| | | | |
|---|---|---|---|
| 4,074,671 A | | 2/1978 | Pennila |
| 4,612,880 A | * | 9/1986 | Brass et al. .................. 123/1 A |
| 5,097,807 A | | 3/1992 | Oikawa et al. |
| 5,546,915 A | * | 8/1996 | Isobe .................... 123/568.12 |
| 5,766,693 A | | 6/1998 | Rao |
| 5,854,990 A | * | 12/1998 | Reckzugel et al. ......... 701/101 |
| 5,960,772 A | * | 10/1999 | Tracy et al. .............. 123/406.4 |
| 6,159,554 A | | 12/2000 | Kloft et al. |
| 6,280,796 B1 | | 8/2001 | Kloft et al. |
| 6,390,054 B1 | | 5/2002 | Yang |
| 6,640,754 B1 | | 11/2003 | Iida |
| 6,662,785 B1 | | 12/2003 | Sloane et al. |
| 6,701,882 B2 | | 3/2004 | Barbezat |
| 6,832,593 B2 | * | 12/2004 | Imoehl ....................... 123/294 |
| 6,877,473 B2 | | 4/2005 | Bischofberger et al. |
| 6,923,167 B2 | | 8/2005 | Flowers |
| 7,134,427 B2 | * | 11/2006 | Colucci et al. ............. 123/572 |
| 2003/0136367 A1 | | 7/2003 | Southerland |
| 2003/0150419 A1 | | 8/2003 | Daragheh et al. |

(Continued)

OTHER PUBLICATIONS

Kamo, R., Thin Thermal Barrier Coatings for Engines, SAE Technical Paper Series, Feb. 27, 1989, pp. 23-28, No. 890143, SAE, Warrendale, PA, USA.

(Continued)

*Primary Examiner*—Erick Solis

(57) ABSTRACT

A method and apparatus for controlling engine operation to compensate for effects of combustion chamber deposits (CCDs) on combustion in a controlled auto-ignition engine is presented. Control methodologies comprise operation of variable valve actuation, fuel injection, spark timing, and intake air and coolant temperature to dynamically compensate for the effect of CCDs. A sensitivity to core gas temperature and chamber wall thermal conditions is shown, which is correlatable to in-cylinder CCD formation. Intake charge or coolant temperature control can be used to compensate for CCD effects. An engine control scheme relies upon a parametric input that quantifies instantaneous CCD formation in the combustion chamber. The result is further applicable to control pre-ignition in a conventional spark-ignition engine.

17 Claims, 6 Drawing Sheets

U.S. PATENT DOCUMENTS

| | | | |
|---|---|---|---|
| 2004/0050359 A1* | 3/2004 | Imoehl | 123/295 |
| 2004/0069286 A1* | 4/2004 | Knowles | 123/572 |
| 2004/0089260 A1 | 5/2004 | Nozaki, et al. | |
| 2004/0226547 A1 | 11/2004 | Holzleitner et al. | |
| 2005/0028764 A1* | 2/2005 | Mitani et al. | 123/90.15 |
| 2005/0065706 A1 | 3/2005 | Gray, Jr. | |
| 2005/0284441 A1 | 12/2005 | Liu et al. | |
| 2005/0288846 A1 | 12/2005 | Liu et al. | |

OTHER PUBLICATIONS

Assanis, D, Evaluation of Alternative Thermocouple Designs for Transient Heat Transfer Measurements in Metal and Ceramic Engines, SAE Technical Paper Series, Feb. 27, 1989, pp. 168-184, No. 890571, SAE, Warrendale, PA, USA.

Cheng, S.S., Effect of Engine Operating Parameters on Engine Combustion Chamber Deposits, SAE Technical Paper Series, Oct. 22, 1990, No. 902108, SAE, Warrendale, PA USA.

Nakic, D.J., Effect of Elevated Piston Temperature on Combustion Chamber Deposit Growth, SAE Technical Paper Series, 1994, pp. 1-13, No. 940948, SAE, Warrendale, PA, USA.

Hopwood, A.B., A Technique to Measure Thermal Diffusivity and Thickness of Combustion Chamber Deposits In-Situ, SAE Technical Paper Series, Oct. 19, 1998, pp. 1-10, No. 982590 SAE, Warrendale, PA, USA.

Nishiwaki, K., The Determination of Thermal Properties of Engine Combustion Chamber Deposits, SAE Technical Paper Series, Mar. 6, 2000, pp. 1-14, No. 2000-01-1215, SAE, Warrendale, PA, USA.

* cited by examiner

METHOD AND APPARATUS TO OPERATE A HOMOGENEOUS CHARGE COMPRESSION-IGNITION ENGINE

CROSS-REFERENCE TO RELATED APPLICATIONS

This application claims priority from U.S. Provisional Application No. 60/737,156, filed Nov. 16, 2005, entitled METHOD AND APPARATUS TO CONTROL COMBUSTION IN A HOMOGENEOUS CHARGE COMPRESSION-IGNITION ENGINE.

TECHNICAL FIELD

This invention pertains generally to internal combustion engine control systems, and more specifically to a method and apparatus to control operation of a homogeneous-charge compression-ignition engine.

BACKGROUND OF THE INVENTION

An internal combustion engine operating under various conditions can experience a build-up of combustion chamber deposits ('CCD'), which comprise a deposition of products of the combustion process onto surfaces of the combustion chamber. The deposits are typically derived from fuels and fuel additives, lubricating oils and oil additives, and other elements, as is known.

As deposits adhere to surfaces of the combustion chamber, thermal characteristics of the engine change. This is primarily due to the combustion chamber deposits acting as an insulating layer on the combustion chamber surfaces, which affects combustion. The result of the formation of the insulating layer includes a decrease in maximum and average heat flux away from the combustion chamber, a decrease in heat transfer to engine coolant, and a decrease in engine breathability, i.e. air flow, leading to a reduced volumetric efficiency. Furthermore, the resultant effects include reduced engine power, a potential for increase in NOx emissions, and an increased likelihood of pre-ignition, or knock. There may be a benefit of improved fuel economy and reduced $CO_2$ emissions.

It is known that to improve thermal efficiency of gasoline internal combustion engines, dilute combustion—using either air or re-circulated exhaust gas—gives enhanced thermal efficiency and low NOx emissions. However, there is a limit at which an engine can be operated with a diluted mixture because of misfire and combustion instability as a result of a slow burn. Known methods to extend the dilution limit include operating the engine under controlled auto-ignition combustion.

One engine system being developed for controlled auto-ignition combustion operation comprises an internal combustion engine designed to operate under an Otto cycle. The engine is preferably equipped with direct in-cylinder fuel-injection and a spark ignition system to supplement the auto-ignition process under limited operating conditions. Such engines are referred to as Homogeneous Charge Compression Ignition, or HCCI engines.

In the HCCI engine, a charge mixture of combusted gases, air, and fuel is created in a combustion chamber, and auto-ignition is initiated simultaneously from many ignition sites within the charge mixture during a compression stroke, resulting in stable power output and high thermal efficiency. Since combustion is highly diluted and uniformly distributed throughout the charge mixture, the burnt gas temperature and hence NOx emissions are typically substantially lower than NOx emissions of a traditional spark ignition engine, and of a traditional diesel engine.

A typical HCCI engine is distinguishable from a spark-ignition engine in that ignition of the charge mixture is caused by compression of the charge mixture. A typical HCCI engine is distinguishable from a compression-ignition engine in that the compression-ignition engine initiates ignition of the combustion charge by injection of fuel, whereas the fuel charge for the typical HCCI engine is preferably injected into the combustion chamber at a time prior to start of ignition of the charge mixture.

It is known that combustion chamber deposits (CCD) form a thermal insulation layer within the cylinder. Combustion chamber deposits have been shown to extend the operating range of HCCI combustion. However, CCD properties and thickness are subject to change during engine operation. Due to different operating characteristics, when combustion chamber deposits are formed on surfaces of a combustion chamber for the typical HCCI engine, there is a resultant change in timing of auto-ignition of the charge mixture and a change in rate of heat release during combustion. This leads to varying combustion performance over time, as shown with reference now to FIGS. 4A and 4B. FIG. 4A comprises a graph of evolving cycle heat release rate at difference instances of a 40-hour test in which an exemplary HCCI engine was operated at 2000 RPM, at an air/fuel ratio of 20:1, injection of 11 milligrams (mg) fuel/cycle, in order to track changes in combustion due to gradual formation of in-cylinder combustion chamber deposits. FIG. 4B comprises a scatter plot showing 100 cycles of a sweep of operating points showing the effect of CCD on HCCI operation. The scatter of cycles shows 10-90% burn duration versus CA10 after different amounts of operation time. By way of explanation, the ignition timing of controlled auto-ignition combustion is defined as the crank angle position at which 10% of the mass fraction of the combustion chamber charge is burned, also referred to as CA10. The burn duration of combustion is defined as the crank angle interval between 10 and 90% mass fraction burned. The results shown with reference to FIGS. 4A and 4B demonstrate that there is a significant change in timing of charge ignition and rate of charge combustion over time of operation attributable to changes in thermal characteristics of the combustion chamber surface. It is demonstrated that magnitude of CCDs has a significant effect on the performance of controlled auto-ignition combustion engines. The effect is that the level of CCD formation needs to be considered in calibration and control of HCCI engine operation.

In the HCCI engine with multiple cylinders, combustion timing for each cylinder can vary significantly due to differences in intake conditions and thermal boundary conditions of individual cylinders, which is further exacerbated by presence and buildup of combustion chamber deposits.

Throttle and EGR valve positions can influence combustion timing but the effects are global, i.e. affecting all cylinders essentially equally. Combustion phasing can be controlled by varying intake/exhaust valve lift profiles and timings for individual cylinders, when an engine is so equipped. This may not be possible in multi-cylinder engines equipped with conventional mechanical cam phasing systems (and not having individual cylinder VVA capability) that are not able to implement individual, cylinder-specific valve lift profiles and timings.

Therefore, it is advantageous to have a control system for an internal combustion engine, including one intended to operate using a controlled auto-ignition process, which controls aspects of engine operation to accommodate changes in thermal characteristics of the combustion chamber surface which are due to combustion chamber deposits. Furthermore, there is a need for a practical way to determine magnitude of CCDs in the combustion chamber as a control input so that engine control systems can account for observed changes in combustion phasing and burn rate.

SUMMARY OF THE INVENTION

The present invention relates to control methodologies for dynamically compensating for effects of combustion chamber deposits on combustion in an engine operative in a controlled auto-ignition mode, to address the issues previously described. The invention describes a control system having an ability to control combustion based upon a magnitude of combustion chamber deposits in the engine operating in the controlled auto-ignition mode. Engine system control actions include control schemes for variable valve actuation, spark timing, fuel injection, EGR and throttle operation, as well as control actions affecting intake and coolant temperatures to compensate for CCD effect on controlled auto-ignition combustion.

The present invention uses engine control methodologies comprising variable valve actuation, fuel injection strategies, spark timing, and intake and coolant temperature control, to dynamically compensate for the effect of CCD on controlled auto-ignition combustion. Utilizing control logic to compensate for the effect of combustion chamber deposits to reduce combustion variability, which can be used in conjunction with other control functions and feedback loops in a known HCCI engine controller.

Results shown herein demonstrate sensitivity of HCCI combustion to core gas and chamber wall thermal conditions, which is correlatable to in-cylinder CCD formation. It becomes apparent that intake charge or coolant temperature control, among other control parameters, can be used to compensate for CCD effects. The invention comprises an engine control scheme which relies upon a parametric input that quantifies instantaneous CCD formation in the combustion chamber.

The present invention comprises a method and control apparatus for operating an internal combustion engine adapted to be operative in a controlled auto-ignition combustion mode. The engine comprises a spark-ignition, direct-injection, four-stroke, internal combustion engine including a variable volume combustion chamber defined by a piston reciprocating within a cylinder between top-dead-center and bottom-dead-center points and a cylinder head comprising an intake valve and an exhaust valve. The method, executed as one or more algorithms and calibrations in a control system, comprises determining a parametric measure of combustion chamber deposits; and, controlling engine operation based upon the parametric measure of combustion chamber deposits.

An aspect of the invention includes controlling engine operation by controlling ignition timing and burn duration of an intake charge when the engine is operated in the controlled auto-ignition combustion mode. This includes controlling temperature of the intake charge by controlling actuation of the EGR valve, and controlling actuation of at least one of the intake and exhaust valves by adjusting at least one of valve lift, valve duration, and valve phasing.

Another aspect of the invention comprises controlling temperature of the intake charge by adjusting fuel injection for the combustion chamber, wherein adjusting fuel injection pulsewidth and timing.

Another aspect of the invention comprises controlling burn duration of the intake charge by controlling surface temperature of the combustion chamber. This preferably includes controlling heat transfer between the combustion chamber and engine coolant, including controlling rate of coolant flow to the engine.

Another aspect of the invention includes measuring combustion chamber deposits during ongoing engine operation, including inferring a measure of combustion chamber deposits during ongoing engine operation based upon engine operating parameters.

Another aspect of the invention includes a method for operating an internal combustion engine comprising a four-stroke internal combustion engine having a variable volume combustion chamber defined by a piston reciprocating within a cylinder between top-dead-center and bottom-dead-center points. There is included a cylinder head comprising an intake valve and an exhaust valve and spark plug operably connected to an ignition module. The method comprises determining a parametric measure of combustion chamber deposits; and, controlling engine operation based upon the parametric measure of combustion chamber deposits. Controlling engine operation preferably comprises controlling timing of spark ignition based upon the parametric measure of combustion chamber deposits to prevent combustion preignition.

Another aspect of the invention comprises a method for operating a multi-cylinder direct-injection, four-stroke internal combustion engine capable of operating with a controlled auto-ignition process. The method comprises determining a parametric measure of combustion chamber deposits; and, controlling engine operation based upon the combustion chamber deposit parameter.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the drawings incorporated hereinafter, comprising.

DETAILED DESCRIPTION OF THE PREFERRED EMBODIMENT

Figure 1:
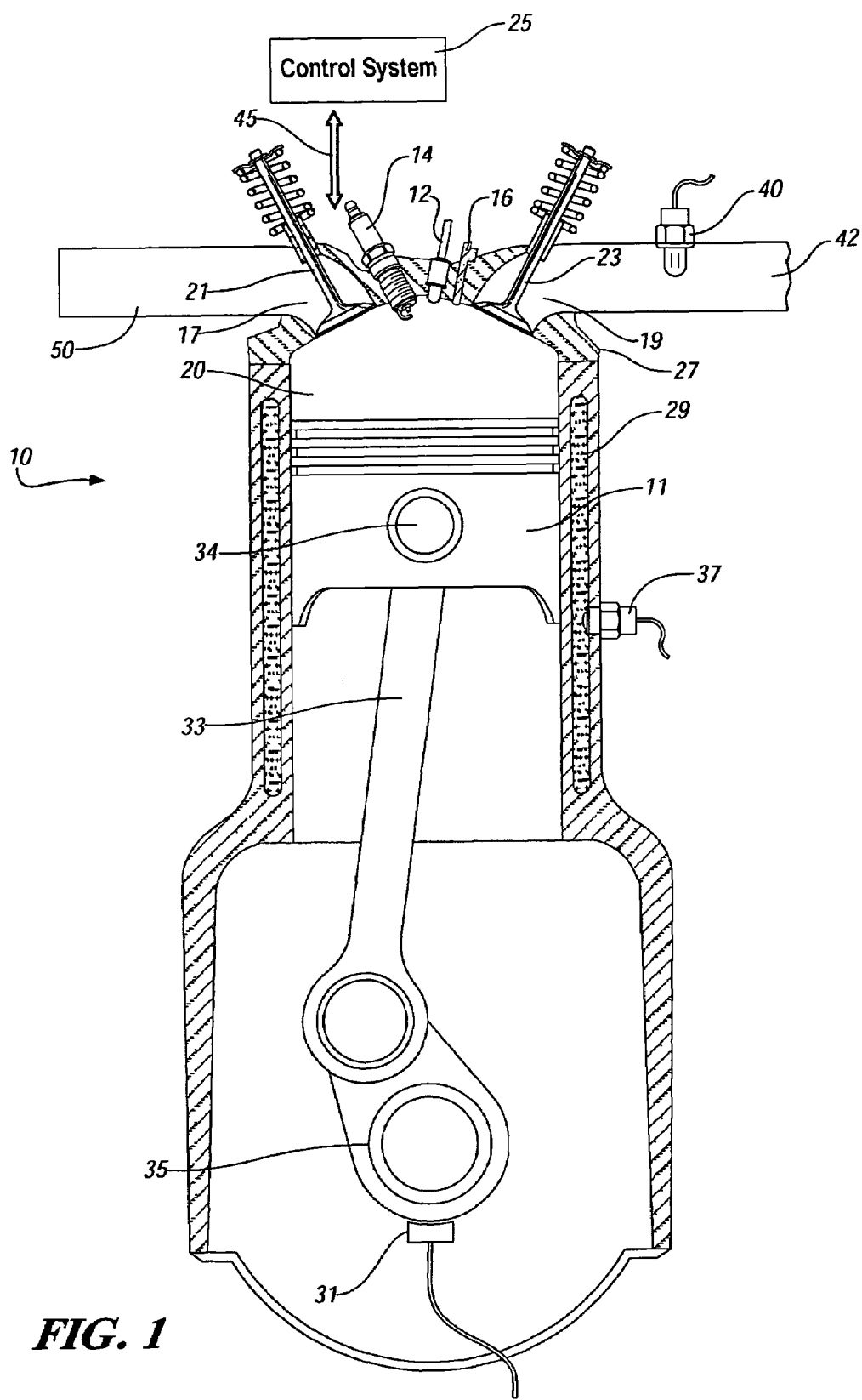
FIG. 1 is a schematic illustration of an internal combustion engine, in accordance with the present invention.

Referring now to the drawings, wherein the showings are for the purpose of illustrating the invention only and not for the purpose of limiting the same, FIG. 1 shows a schematic of an internal combustion engine 10 and control system 25 which has been constructed in accordance with an embodiment of the present invention. The embodiment as shown is applied as part of an overall control scheme to operate an exemplary multi-cylinder spark ignition, direct-injection, gasoline, four-stroke internal combustion engine adapted to operate under a controlled auto-ignition process, also referred to as homogenous-charge, compression-ignition ('HCCI').

The exemplary engine 10 comprises: a cast-metal engine block with a plurality of cylinders 13 formed therein, one of which is shown, and an engine head 27. Each cylinder 13 comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant sensor 37, operable to monitor temperature of the coolant fluid, is located at an appropriate location, and provides a parametric signal input to the control system 25 useable to control the engine.

In one embodiment of the invention, a cooling system for the engine is mechanized to effect variable coolant flow rate through the engine. An exemplary coolant fluid flow system comprises a coolant sump, e.g. a tank, a pump, a flow control valve, a fluid circuit leading to the engine block and away from the engine block, a restriction, and a return flow circuit to the sump. A control algorithm, preferably an element of the control system 25, operates to control rate of flow of coolant fluid to the engine block based upon feedback from the coolant sensor. This permits real-time control of temperature of the engine block, and therefore controls combustion chamber surface temperature.

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder 13. A crank sensor 31 is placed in an appropriate location, operable to generate a signal that is useable by the controller 25 to measure crank angle, and which is translatable to provide-measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23. The intake and exhaust valves 21, 23 each have a head portion that includes a top portion that is exposed to the combustion chamber. Each of the valves 21, 23 has a stem that is connected to a valve actuation device. Valve actuation devices (not shown) can comprise any one of a plurality of known devices that are operable to control timing, duration, and magnitude of opening and closing of each of the valves, either in concert, e.g. a camshaft, or separately using individual actuation devices, and are not described in detail herein. The valve actuation devices are preferably controlled by the control system 25 according to known predetermined control schemes. Specific details of control schemes to control opening and closing of the valves are known and not detailed herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensor 40 can comprises any one of several known sensing devices operative to provide parametric values for the exhaust gas feedstream, including air/fuel ratio, exhaust gas constituents, e.g. NOx, CO, HC, and others. The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and, driveability. The control system 25 is operably connected to a plurality of devices through which an operator typically controls or directs operation of the engine. Exemplary operator inputs include an accelerator pedal, a brake pedal, transmission gear selector, and, vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire parametric data from sensors, and control a variety of actuators, respectively, of the engine 10 over a plurality of discrete lines collectively shown as aggregate line 45. The control system 25 receives an engine torque command, and generates a desired torque output, based upon the operator inputs. Engine operating parameters that are typically sensed by control system 25 using the aforementioned sensors include engine coolant temperature, crankshaft rotational speed ('RPM') and position, manifold absolute pressure, ambient air flow and temperature, and, ambient air pressure. Combustion performance measurements typically comprise measured and inferred combustion parameters, including air/fuel ratio, location of peak combustion pressure (LPP), amongst others.

Another engine operating parameter comprises determining magnitude of combustion chamber deposits ('CCD') during engine operation. An exemplary method and apparatus to determine magnitude of combustion chamber deposits is disclosed in detail in commonly assigned U.S. patent application Ser. No. 11/399,197, entitled METHOD AND APPARATUS TO DETERMINE MAGNITUDE OF COMBUSTION CHAMBER DEPOSITS, which is incorporated herein by reference. As described therein, the invention comprises analysis of in-cylinder measurements to determine the magnitude of combustion chamber deposits. This method and apparatus is shown in FIG. 1, for sake of clarity, as device 16.

Actuators controlled by the control system 25 include: fuel injectors 12; intake and exhaust valve actuators and control modules (not shown), e.g. cam phasers, cylinder deactivation devices, and other devices for controlling magnitude, duration, and timing of valve opening and closing events; spark plug 14 operably connected to ignition modules for controlling spark dwell and timing; exhaust gas recirculation (EGR) control devices (not shown), and, electronic throttle control modules (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across the engine speed and load range. When the exemplary engine is operated under controlled auto-ignition combustion mode, the engine typically does not operate the spark plug for most operating conditions. It has proven desirable to use a spark plug to complement the auto-ignition operating mode under certain conditions, including, e.g. during cold start and at low load operating conditions near a low-load limit. Also, it has proven preferable to rely on spark ignition at a high load operation limit in controlled auto-ignition combustion mode, and at high speed/load operating conditions under throttled or un-throttled spark-ignition operation.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event.

Figure 2:
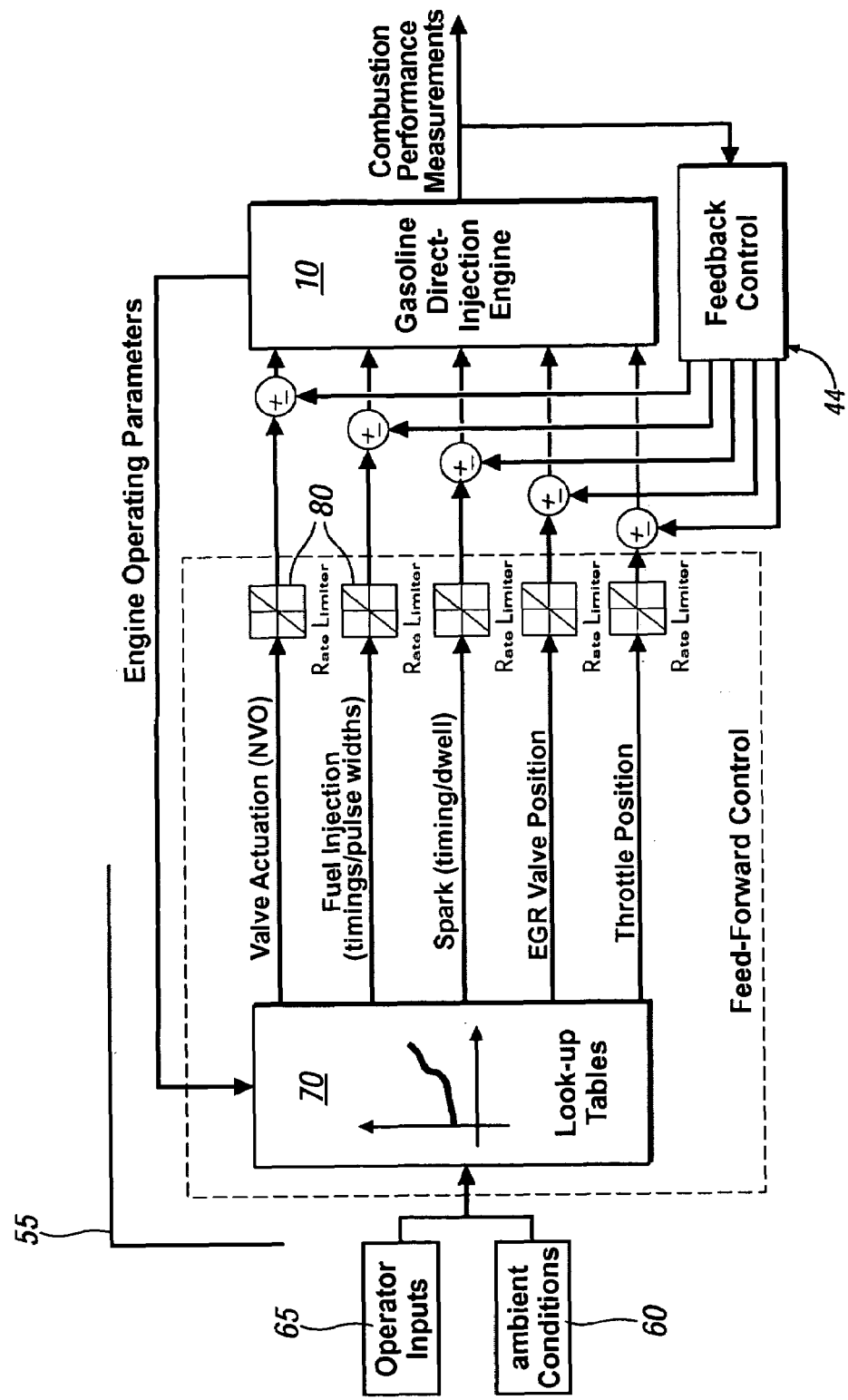
FIG. 2 is a is a schematic illustration of an exemplary control scheme, in accordance with the present invention.

Referring now to FIG. 2, a description of a control subsystem 55 operable to control operation of the engine based upon a parametric measure of CCD is now provided. The control subsystem 55 is preferably executed as one or more algorithms and calibration tables in the engine control system 25, and comprises synthesizing the aforementioned operator inputs 65, ambient conditions 60, engine operating parameters, and combustion performance measurements, and executing algorithms to control various actuators of the engine 10 to achieve targets for control parameters. The control parameters of interest comprise the aforementioned engine operating parameters and the combustion performance measurements output from the engine. The combustion performance measurements are preferably translatable to measures of ignition timing and burn duration occurring during controlled auto-ignition combustion. Ignition timing of controlled auto-ignition combustion is defined as the crank angle position, measured in degrees after top-dead-center ('deg aTDC') at which 10% of the mass fraction of the combustion chamber charge is burned (CA10). Burn duration of combustion is defined as the crank angle interval, in crank angle degrees ('CAD') between 10 and 90% mass fraction burned. Examples of each are shown with reference to FIGS. 3A and 3B.

Referring again to FIG. 2, the control subsystem 55 includes a feedforward control scheme and a feedback control scheme. The control subsystem 55 is preferably executed as part of ongoing engine control to achieve a fast and effective system response to major changes of operating conditions, typically due to changes in the operator inputs 65 and ambient conditions 60.

The feedforward control scheme comprises two major elements: precalibrated look-up tables 70 and rate limiters 80. The precalibrated look-up tables 70 comprise control parameters calculated for each engine control actuator mechanized on the engine, including intake and exhaust valve actuation, fuel injection (timings and pulse widths), spark dwell and timing, EGR valve position, and throttle valve positions. The control parameters for each of the actuators are based on operator inputs 65, ambient conditions 60 and engine operating parameters, and are taken from the look-up tables to control engine operation and combustion phasing (Block 70), using engine operating parameters preferably including coolant temperature and CCD formation tracking. Outputs from the lookup tables comprise actuator-appropriate command signals to control operation of the actuators. The outputs from the lookup tables are passed through one of a plurality of rate-limiters 80.

The feedforward rate limiters 80 are preferably actuator control factors which comprise maximum and minimum rates of change for each of the controlled actuators. The rate limiters 80 each compensate for component and system capabilities and dynamics. Examples of component capabilities include response times for the various actuators, dynamic operating range of fuel injectors, and valve operation leading to valve/piston collisions. Examples of system and component dynamics, include, e.g., air and fuel dynamics related to cylinder-to-cylinder imbalances of airflow, fuel, EGR fraction, and cylinder temperatures. Determination of engine control system rate limiters 80 for various actuators is known and not discussed in detail herein.

The feedback control scheme 44 is preferably an element of the overall engine control scheme, and comprises adjusting control signals for each of the engine control actuators to maintain and control engine operating stability as determinable by feedback from the combustion performance measurements. The combustion performance measurements are used to provide adjustments to control parameters for each of valve actuation, fuel injection (timings and pulse widths), spark dwell and timing, EGR valve position, and throttle valve positions. Such operation seeks to maintain operation of the engine 10 to meet the aforementioned requirements.

Figure 3A:
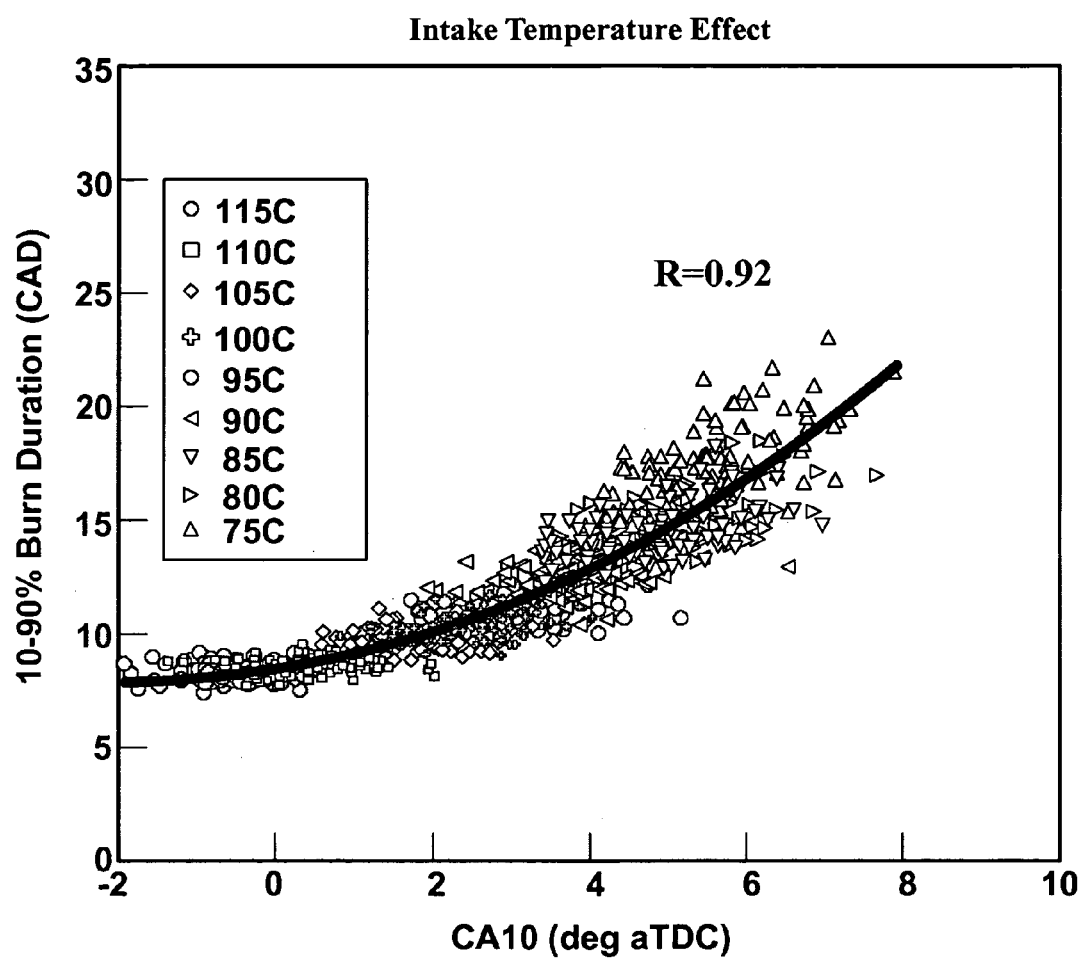
FIGS. 3A and 3B comprise data graphs, in accordance with the present invention; and, FIGS. 4A and 4B comprise data graphs, in accordance with the present invention.
Figure 3B:
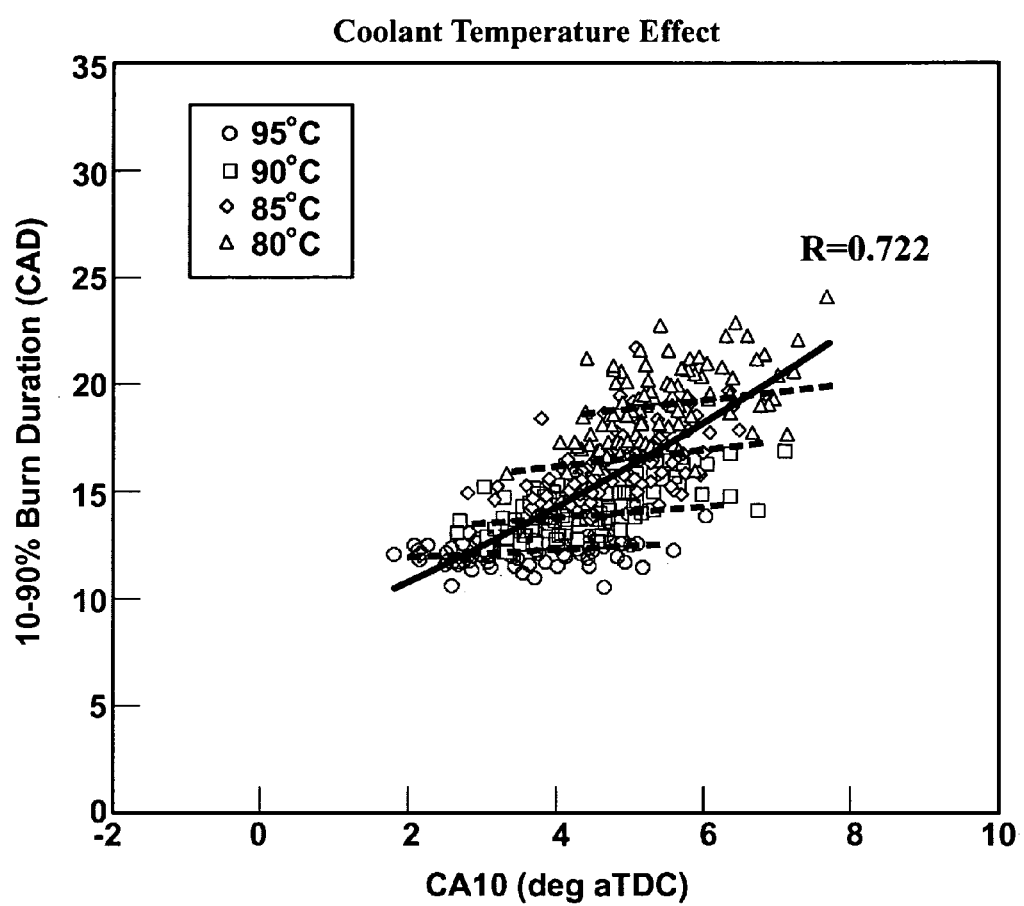
Figure 4A:
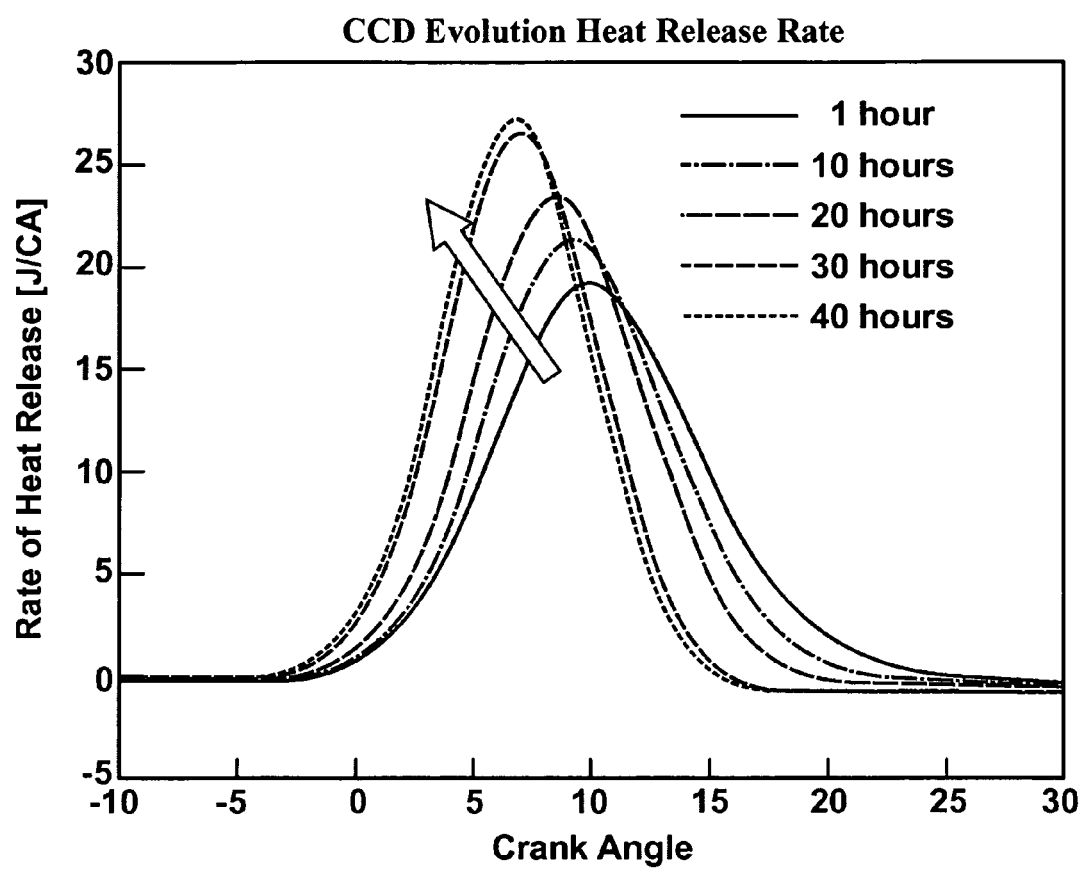
Figure 4B:
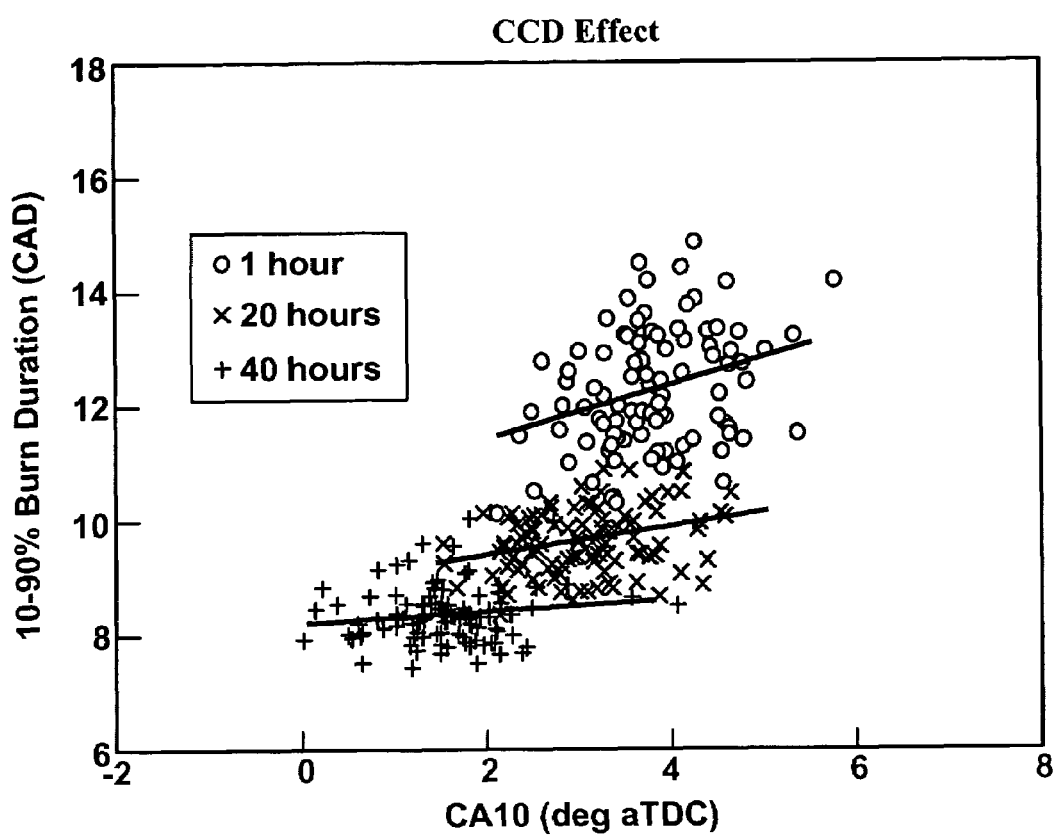

Referring again to FIGS. 4A and 4B and to FIGS. 3A and 3B, operation of the control subsystem 55 is described in more detail. FIG. 4A comprises a graph showing changes in rate of heat release during combustion (in Joules/crank angle, or J/CA) due to gradual formation of in-cylinder combustion chamber deposits over operating time. FIG. 4B comprises a scatter plot showing effect of CCD formation on 10-90% burn duration versus CA10 after different amounts of operation time. The results shown in FIGS. 4A and 4B demonstrate that there is a significant change in timing of charge ignition and rate of charge combustion over time of operation attributable to changes in thermal characteristics of the combustion chamber surface, which are attributed herein to formation of CCDs. Results shown with reference to FIGS. 3A and 3B demonstrate the measurement of 10-90% burn duration as a function of CA10 with variations in intake charge temperature (FIG. 3A) and coolant temperature (FIG. 3B). It is observed that increasing either the coolant temperature or the intake charge temperature has a significant influence on both ignition timing and burn rates during controlled auto-ignition combustion, but the character of influence varies between the two. To summarize the findings of the work shown, intake charge temperature has a greater influence on core gas temperatures leading up to auto-ignition, thus directly affecting ignition timing. Coolant temperature changes have a greater influence on wall temperature and hence thermal stratification near the cylinder wall. While cylinder wall temperature affects auto-ignition timing too, its effect on bulk burning portion of combustion is much greater because fuel-air mixtures near the periphery of the combustion chamber are typically last to burn. Furthermore, it can be determined that for the same variation in burn duration per cycle, less coolant temperature change is required than intake temperature, indicating that controlled auto-ignition combustion burn rates are much more sensitive to wall temperature effects.

Therefore, the control subsystem 55 operates to determine the parametric measure of CCDs in the combustion chamber 20, and translate the CCD formation to determine an effect upon combustion. The control scheme includes controlling ignition timing and burn duration of each intake charge when the engine is operated in controlled auto-ignition combustion mode. Controlling ignition timing includes controlling temperature of the intake charge, which comprises controlling the EGR fraction (% of charge) in the combustion charge by controlling actuation of an EGR valve (when the engine is so equipped) and controlling operation of the intake and exhaust valves 21, 23. Controlling operation of the intake and exhaust valves 21, 23 includes managing magnitude of internal EGR flow in each cylinder by controlling intake/exhaust valve overlap, including controlling phasing, valve open duration, and valve lift for each of the valves. Controlling ignition timing can also include controlling spark timing under operating conditions wherein it is used. Controlling ignition timing and burn duration also includes controlling adjusting fuel injection pulsewidth and timing to adjust the fuel charge.

As indicated by the results shown in FIG. 3B, controlling burn duration of each combustion charge comprises controlling combustion chamber surface temperature. Surface temperature control includes managing heat transfer from the combustion chamber, including controlling rate of coolant flow to the engine to control engine coolant temperature.

There are specific engine conditions, e.g. prolonged engine operation at high-load, that lead to reduced CCD thickness once CCD has been formed in the combustion chamber. Peak surface temperature phasing advances under prolonged high-load engine operation, and this information is processed in the engine controller to estimate a change in thickness, along with a required control action to adjust the controlled auto-ignition combustion burn rate phasing and magnitude. In contrast, under conditions of frequent cold starts, short driving distances or specific fuel properties can lead to increased CCD thickness, thus leading to a control action in the opposite direction. The feedback part is crucial for controlled auto-ignition combustion mode transition between lean and stoichiometric operations and cycle-to-cycle control. Compensating for CCD thickness variations in the feedforward part facilitates accurate and robust actions of the feedback part.

In addition to the demonstrated need to compensate for CCD growth during HCCI combustion, the proposed methodology and control scheme can be used during spark-ignition (SI) operation. Combustion chamber deposits can have a critical effect on the occurrence of knock in the SI engine and increase in fuel minimum required octane rating. Control schemes utilizing the CCD parameter for in-situ CCD growth can be utilized for more accurate control of spark timing in order to prevent the onset of engine knock.

The effect of CCD formation on a conventional spark-ignition engine is now described. Fuel-based and lubricant-based combustion chamber deposits are well documented phenomena for all types of internal combustion engines. Effect of CCDs on combustion can vary depending on fuels, type of engine cycles, and operating conditions. The most common problem of CCDs on traditional spark-ignition engines is its propensity to increase engine knock. This is commonly referred to as 'octane requirement increase' or ORI. This is a result, in part, on an increase in the effective compression ratio of the engine which increases with increasing CCD, due to reduced cylinder volume displacement. Further, presence of CCD on the cylinder chamber wall, the head, valves, and piston acts as a thermal insulator. Therefore, the end-gas temperature of each combustion cycle increases due to an increase in compression ratio, an increase in combustion chamber surface temperature and a reduction in heat loss through the various components forming the combustion chamber. Therefore, a conventional engine control system having knock control uses the CCD, as measured by the aforementioned method and apparatus to determine magnitude of CCDs, to provide a feed-forward control of ignition timing under specific conditions conducive to knock, or pre-ignition.

Furthermore, when considering the influence of wall thermal conditions on HCCI, as described above, CCD formation can have a significant effect on the main combustion event in exemplary controlled auto-ignition combustion engines. Controlled auto-ignition engine's mode of operation can be described in lay terms as "controlled knock", wherein chemical kinetics of pre-ignition reactions determine ignition timing and burning rates. Any change of thermal conditions at boundaries has an influence upon all stages of combustion.

The invention has been described with specific reference to the exemplary embodiments and modifications thereto. Further modifications and alterations may occur to others upon reading and understanding the specification. It is intended to include all such modifications and alterations insofar as they come within the scope of the invention.

The invention claimed is:

1. Method for operating an internal combustion engine adapted to be operative in a controlled auto-ignition combustion mode, said engine comprising a spark-ignition, direct-injection, four-stroke, internal combustion engine including a variable volume combustion chamber defined by a piston reciprocating within a cylinder between top-dead-center and bottom-dead-center points and a cylinder head comprising an intake valve and an exhaust valve, the method comprising:

determining a parametric measure of combustion chamber deposits; and, controlling engine operation based upon the parametric measure of combustion chamber deposits.

2. The method of claim 1, wherein controlling engine operation based upon the parametric measure of combustion chamber deposits comprises controlling ignition timing and burn duration of an intake charge when the engine is operated in the controlled auto-ignition combustion mode.

3. The method of claim 2, wherein controlling burn duration of the intake charge comprises controlling surface temperature of the combustion chamber.

4. The method of claim 3, wherein controlling surface temperature of the combustion chamber comprises controlling heat transfer between the combustion chamber and engine coolant.

5. The method of claim 4, wherein controlling heat transfer between the combustion chamber and engine coolant comprises controlling rate of coolant flow to the engine.

6. The method of claim 2, wherein controlling ignition timing of the intake charge comprises controlling temperature of the intake charge to the combustion chamber.

7. The method of claim 6, wherein controlling temperature of the intake charge comprises controlling actuation of an exhaust gas recirculation valve.

8. The method of claim 6, wherein controlling temperature of the intake charge to the combustion chamber comprises controlling actuation of at least one of the intake and exhaust valves.

9. The method of claim 8, wherein controlling temperature of the intake charge comprises controlling actuation of at least one of the intake valve and the exhaust valve.

10. The method of claim 9, wherein controlling actuation of at least one of the intake valve and the exhaust valve further comprises adjusting at least one of valve lift, valve duration, and valve phasing.

11. The method of claim 10, wherein controlling temperature of the intake charge comprises controlling magnitude of exhaust gas recirculation to the combustion chamber.

12. The method of claim 1, wherein determining a parametric measure of combustion chamber deposits further comprises measuring combustion chamber deposits during ongoing engine operation.

13. The method of claim 1, wherein determining a parametric measure of combustion chamber deposits further comprises inferring a measure of combustion chamber deposits during ongoing engine operation based upon engine operating parameters.

14. The method of claim 1, wherein controlling engine operation based upon the parametric measure of combustion chamber deposits comprises adjusting fuel injection for the combustion chamber, wherein adjusting fuel injection comprises adjusting at least one of fuel injection pulsewidth and timing of fuel injection.

15. Method for operating an internal combustion engine comprising a spark-ignition, four-stroke internal combustion engine including a variable volume combustion chamber defined by a piston reciprocating within a cylinder between top-dead-center and bottom-dead-center points a cylinder head comprising an intake valve and an exhaust valve and spark plug operably connected to an ignition module, the method comprising:

determining a parametric measure of combustion chamber deposits; and, controlling engine operation based upon the parametric measure of combustion chamber deposits.

16. The method of claim 15, wherein controlling engine operation based upon the parametric measure of combustion chamber deposits further comprises controlling timing of spark ignition based upon the parametric measure of combustion chamber deposits to prevent combustion preignition.

17. A method for operating a multi-cylinder direct-injection, four-stroke internal combustion engine capable of operating with a controlled auto-ignition process, comprising:

determining a parametric measure of combustion chamber deposits; and, controlling engine operation based upon the combustion chamber deposit parameter.

* * * * *